(12) United States Patent
Stark

(10) Patent No.: US 11,460,390 B2
(45) Date of Patent: Oct. 4, 2022

(54) MOISTURE SENSOR ELEMENT, METHOD FOR PRODUCING A MOISTURE SENSOR ELEMENT, MOISTURE OR DEW POINT SENSOR AND MOISTURE-MEASURING METHOD

(71) Applicant: Trafag AG, Bubikon (CH)

(72) Inventor: Wendelin J. Stark, Langenthal (DE)

(73) Assignee: Trafag AG, Bubikon (CH)

( * ) Notice: Subject to any disclaimer, the term of this patent is extended or adjusted under 35 U.S.C. 154(b) by 206 days.

(21) Appl. No.: 16/765,347

(22) PCT Filed: Nov. 19, 2018

(86) PCT No.: PCT/EP2018/081825
§ 371 (c)(1),
(2) Date: Jul. 2, 2020

(87) PCT Pub. No.: WO2019/097069
PCT Pub. Date: May 23, 2019

(65) Prior Publication Data
US 2020/0355591 A1    Nov. 12, 2020

(30) Foreign Application Priority Data
Nov. 20, 2017   (DE) .................... 10 2017 127 341.7

(51) Int. Cl.
*G01N 5/00*        (2006.01)
*G01N 5/02*        (2006.01)
(Continued)

(52) U.S. Cl.
CPC ........... *G01N 5/025* (2013.01); *G01N 29/022* (2013.01); *G01N 29/036* (2013.01); *G01N 2291/0253* (2013.01); *G01N 2291/02845* (2013.01)

(58) Field of Classification Search
CPC .... G01N 5/025; G01N 29/022; G01N 29/036; G01N 2291/0253; G01N 2291/02845; G01N 2291/0255; G01N 2291/0256
See application file for complete search history.

(56) References Cited

U.S. PATENT DOCUMENTS 6,150,089 A * 11/2000 Schwartz ............... C12Q 1/683
204/600
6,223,588 B1 * 5/2001 Burgass ................. G01N 25/12
73/19.01

(Continued)

OTHER PUBLICATIONS

Banda, L. et al., "Realtime Monitoring of Mass-Change During the Structural Evolution of An Epoxy Glass Subsequent to Relative Humidity Jumps through the Glass Transition," Conference Proceeding ANTEC 2004, Chicago, Illinois, vol. 2: S 2302-2306 (2004).

(Continued)

*Primary Examiner* — Francis C Gray
(74) *Attorney, Agent, or Firm* — United One Law Group LLC; Kongsik Kim; Jhongwoo Peck

(57) ABSTRACT

In order to permit a robust, energy-efficient and precise moisture sensor, the invention relates to a moisture sensor element (10) for a moisture sensor (12) for measuring a moisture content in a gas, comprising at least one vibrating element (14) and at least one material (16, 18) on the vibrating element (14), wherein the at least one material (16, 18) is designed in such a way that the mass thereof changes rapidly with moisture changing over a moisture value. The invention also relates to a moisture-measuring method for measuring a moisture in a gas, comprising: using a moisture sensor element (10), wherein the course of the measurement signal thereof has at least one non-linearity according to the moisture; and determining a reference value based on the at least one non-linearity.

13 Claims, 5 Drawing Sheets

(51) Int. Cl.
    *G01N 29/02*     (2006.01)
    *G01N 29/036*    (2006.01)

(56)            References Cited

U.S. PATENT DOCUMENTS

| | | | | |
|---|---|---|---|---|
| 8,904,850 | B1* | 12/2014 | Allendorf | G01N 29/036 |
| | | | | 73/29.01 |
| 2006/0005608 | A1* | 1/2006 | Kitzhoffer | G01N 15/0893 |
| | | | | 73/38 |
| 2006/0032290 | A1* | 2/2006 | Liu | G01N 29/326 |
| | | | | 73/29.02 |
| 2008/0108122 | A1* | 5/2008 | Paul | B01F 33/3012 |
| | | | | 422/129 |
| 2009/0211335 | A1* | 8/2009 | Jovancicevic | G01N 17/008 |
| | | | | 73/23.35 |
| 2016/0123930 | A1* | 5/2016 | Noyce | G01N 29/2437 |
| | | | | 422/69 |
| 2016/0131615 | A1* | 5/2016 | Sun | G03F 7/0002 |
| | | | | 264/293 |

OTHER PUBLICATIONS

Lazarowich, R.J. et al., "Fabrication of porous alumina on quartz crystal microbalances," Journal of Applied Physics, vol. 101: 104909: 8 pages (2007).

Su, P-I., "Humidity sensing properties of calix[4]arene and functionalized calix[4]arene measured using a quartz-crystal microbalance," Sensors and Actuators B, vol. 181: 795-801 (2013).

* cited by examiner

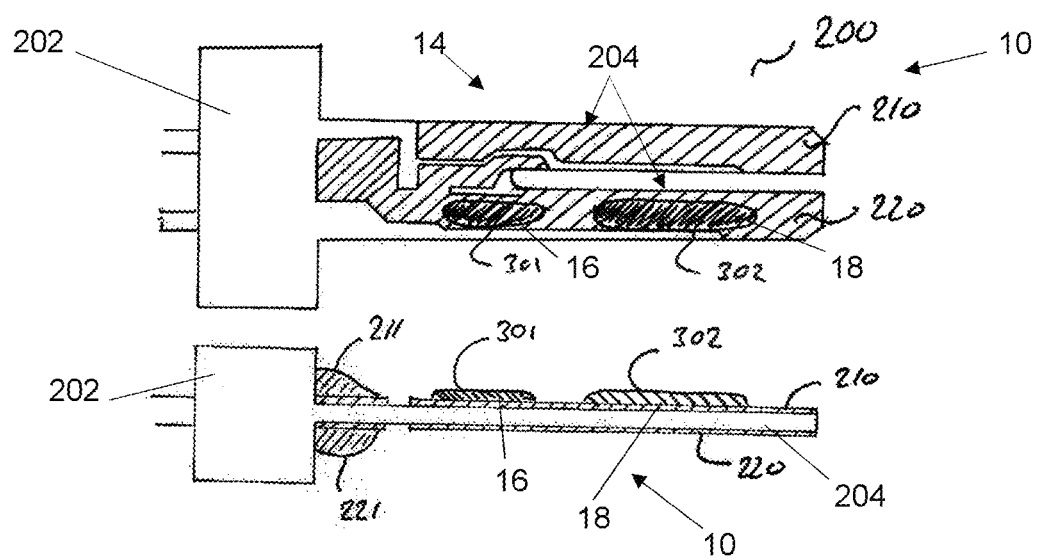
Fig. 3a
Fig. 3b
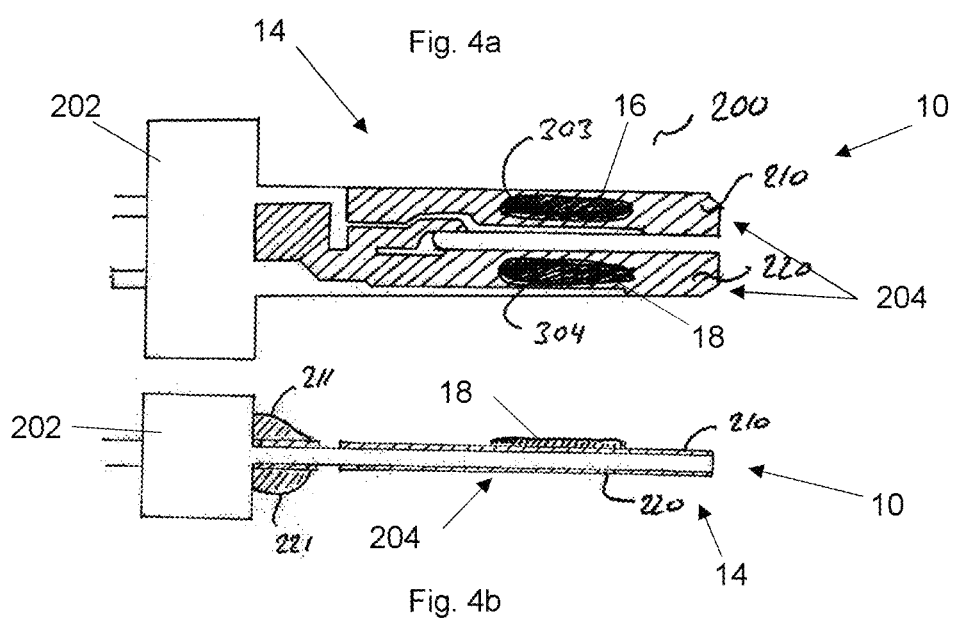
Fig. 4a
Fig. 4b

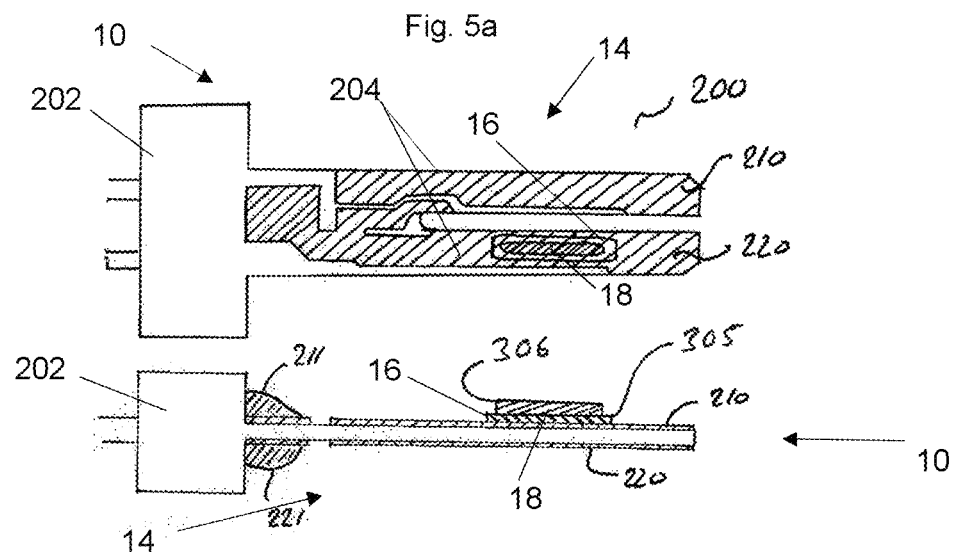
Fig. 5a
Fig. 5b
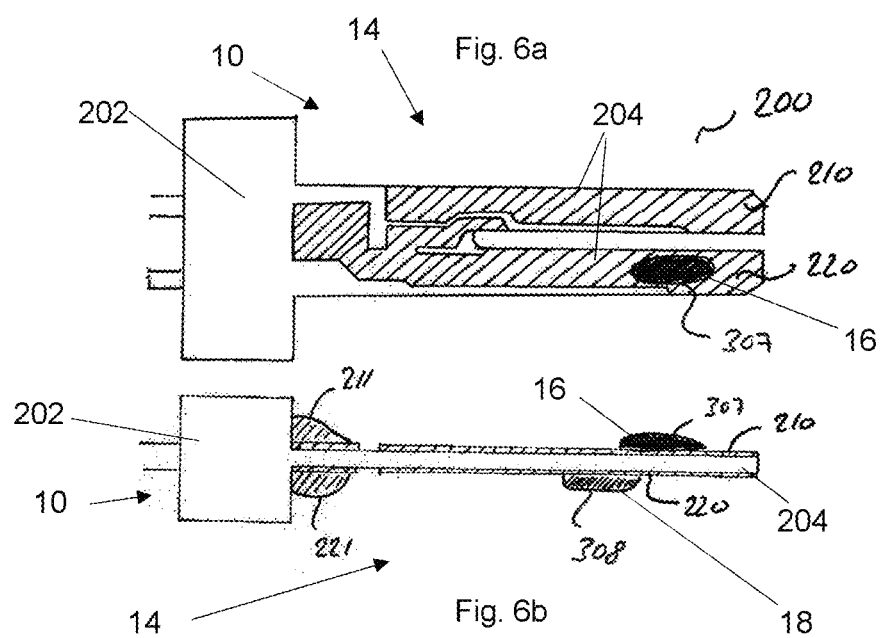
Fig. 6a
Fig. 6b

MOISTURE SENSOR ELEMENT, METHOD FOR PRODUCING A MOISTURE SENSOR ELEMENT, MOISTURE OR DEW POINT SENSOR AND MOISTURE-MEASURING METHOD

TECHNICAL FIELD

The invention relates to a moisture sensor element for a moisture sensor for measuring a moisture content in a gas. The invention also relates to a method for producing such a moisture sensor, to a moisture or dew point sensor including such a moisture sensor element, and to a moisture-measuring method which can be carried out in particular with such a moisture sensor element.

Preferred embodiments of the invention concern a device and a method for determining the dew point.

Preferred aspects of the invention concern a device for determining the moisture content in a gas, the device comprising a vibrating element loaded with at least one and preferably several material(s), an electronic component, preferably for evaluating the vibration behavior of the vibrating element, a housing with at least one opening, and optionally an element for increasing the temperature of the vibrating element and the materials loaded thereon. Preferred further aspects of the invention relate to a method for determining the dew point temperature of gases, in which method the at least one material, preferably the materials, on the vibrating element are brought into contact with the gas to be measured through the opening in the housing and the vibration behavior is detected by the electronics. Optionally, the materials on the vibrating element are heated for a short time by the element for increasing the temperature.

The dew point is a pair of values consisting of the dew point temperature and the pressure of the corresponding gas and describes the point at which the gas phase in a mixture of gas and vapor is just saturated with the amount of vapor present. The dew point temperature of a moist gas that is not saturated with vapor is the temperature down to which the gas mixture can be cooled isobarically until the first condensation of vapor occurs.

BACKGROUND

The measurement of the moisture content in moist gases is of broad technical interest. Prior art accordingly describes a number of methods and devices for determining the dew point in gases. One of the most widely used measuring principles is based on the so-called thermal dew-level hygrometer and the dew point hygrometer in which a surface is cooled until liquid water is separated on this surface by condensation of the vapor. The formation of tiny droplets or thin films of water on these surfaces can then be detected using optical, capacitive, resistive or thermal methods. Usually, the temperature is kept close to the dew point temperature and is increased for measurement and lowered again.

An alternative measuring principle for measuring the dew point is based on the use of coated quartz oscillators or other piezoelectric crystals. The piezoelectric crystal sensors comprise acoustic wave sensors such as thickness shear vibration (TSM) devices, acoustic surface wave (SAW) devices, acoustic plate mode (APM) devices and bent plate wave (FPW) devices and other arrangements of vibrating elements based on piezo crystals known to the expert. Preferred configurations of the invention also use such elements as vibrating element.

Piezoelectric crystal sensors preferred for configurations of the invention are quartz crystal microbalances (QCM) and quartz crystal tuning fork sensors (QTF). The use of quartz in the so-called AT cut allows a low temperature dependence of the vibration behavior. The quartz is embedded between at least two electrodes and is made to vibrate by applying a drive signal. The drive signal is generated by suitable electronics and is sufficiently known to the expert. A change of the vibration behavior is also detected and evaluated by suitable electronics. Suitable methods and devices are sufficiently known to the expert.

The basics of this type of sensors are described by William H. King, Esso Research, Analytical Chemistry, Vol 36, No. 9, August 1964, pp. 1735 to 1739, who among other things points out to drift and emphasizes the need for uniform coating of the sensors and the importance of the linearity of the sensor (page 1738, middle).

The use of piezo crystal sensors for measuring the dew point is described among others in DE 698 16 431 A1. Here, standard QCM quartz platelets are installed in a pressure chamber. When the dew point is reached, the oscillation frequency of the quartz platelet changes. The described use of a temperature-controlled pressure chamber requires considerable amounts of energy for operation and is therefore not suitable for mass use or operation over a long period of time without a costly power supply or without supply via a mains connection.

A coating of the piezo crystal sensors can be used to specifically detect a certain chemical or to improve the sensitivity of the sensor. Application CH 465 275 A describes a series of coatings for the detection of specific materials. A prominent feature of these sensors is their linearity, which is explicitly referred to in CH 465 275 A.

JP 07 260 661 A describes the use of polyether sulfone as a coating for a moisture sensor based on a QCM and also refers to linearity.

U.S. Pat. No. 3,677,066 A describes the improvement of the reliability of such sensors after a pre-treatment of the sensor and again refers to the linearity of the signal depending on the concentration to be measured. This measuring principle is based on the linearity of the increase in mass as a function of the concentration of a substance to be measured and is characterized by high linearity which is explicitly referred to several times. In particular, U.S. Pat. No. 3,667,066 A illustrates the widely used measuring principle of this group of sensors: moisture or water vapor diffuses into a layer and thereby increases the mass of the layer. The layer is applied to a suitable vibrating element, and the mass change of the layer can be measured via the very well-known relations, among others the Sauerbrey equation. The linearity of the response is a central element of such measuring principles.

U.S. Pat. No. 4,973,182 A is based on the same measuring principle and also describes a group of possible water-absorbing materials (aluminum oxide water-attracting polymers and copolymers, water-attracting, dissolving salts) on a QCM sensor which is operated at constant temperature. The sensors are covered by the water-absorbing material over as large an area as possible or even completely. Again, the principle of measurement is based on a change in mass on the QCM sensor, which in turn is detected by a changed vibration behavior. The change in mass takes place continuously and linearly by water being absorbed into the layer. The evaluation is done by a calibration function which links the frequency/change in mass and the moisture content or dew point.

U.S. Pat. No. 6,126,311 A describes a dew point sensor based on MEMS technology, wherein a cooling or heating unit is used to bring the temperature of the vibrating element above or below the dew point and wherein the dew point is determined by detecting the vibration change. Cooling and heating require considerable amounts of energy and make such sensors dependent on continuous power supply.

U.S. Pat. No. 6,295,861 A describes the use of differently coated QCMs in a common housing. Again, coatings based on polymer are disclosed, especially polystyrene sulfonic acid, polyvinyl chloride polyvinyl acetate copolymers, siloxanes and polyethylene oxides, all of which leading to the above-mentioned linear response of the sensor. What is claimed is a QCM pair accommodated in a housing, one sensor being coated with polyethylene oxide and the other sensor with a siloxane. This method is based on that different layers on QCM lead to a different behavior towards a substance to be tested. The use of several QCMs, each individually covered with a different layer, improves the quality of such sensor groups.

US 2006/0032290 A1 describes the use of moisture absorber materials and a heating element directly on the vibrating element. The use of polymers, hybrid materials and inorganic materials is broadly described. Preferably, several sensors are used in common, each individually with different coatings. The use of such groups of sensors with different coatings is mentioned as preferred if moisture and dew point are to be detected. US 2006/0032290 A1 also refers to the problem of saturation of such sensors, as the condensed water is difficult to remove from the sensors and thus a useful response of the sensor after saturation can be greatly delayed. The groups of sensors as claimed lead to that condensed water can be shaken off. Further described is the adjustment of the coating materials to the moisture to be measured, a difference being made between chemisorption and physical adsorption of water. The sensors can be heated and thus regenerated by a resistance heater attached to the rear of the vibrating elements. US 2006/0032290 A1 discloses the necessity of periodically heating the sensors and places the heating element directly onto the vibrating element. This makes the vibrating element much heavier. The combination of various manufacturing techniques (quartz crystal cutting; cutting off metal electrodes, preferably platinum) and materials result in a vibrating element of different strength and hence a vibration behavior which is less precise. This lowers the quality factor and thus the discriminatory power in the detection of vibration changes. US 2006/0032290 A1 further discloses the difficulties of calibration and finding the zero point. In demanding environments with changing conditions (pressure, temperature, at best overall composition, impurities), the retrieval of a specific reference value or finding the internal zero point of a sensor is crucial, as otherwise the readout measured values are subject to a drift that is difficult to detect.

WO 2015/085298 describes a pair of QCM sensors, one of these sensors being coated for detecting thiols in gases and the other QCM sensor serving as reference.

The measurement of low moisture contents is technically particularly demanding. U.S. Pat. No. 5,615,954 describes the use of a low temperature instrument with a correspondingly high energy demand. Moreover, the use of liquefied gas for cooling is not suitable for transportable or even decentralized sensors, since such gases must be refilled accordingly, which leads to high maintenance costs. It is obvious that such arrangements are not suitable to be operated with low energy consumption and maintenance-free.

Vibration-based systems therefore exist in a wide variety and are largely based on the introduction of the principle by William H. King (Analytical Chemistry, Vol 36, No. 9, August 964, pp. 1735 to 1739). The problems described regarding drift, zero point finding and long-term stability have been attempted to be improved in various ways, resulting either in complex (large, heavy and/or expensive) devices that require high power or maintenance, or, in the case of modern MEMS-based systems, in devices that are sensitive or continue to exhibit significant drift, or in the need to use a larger number of sensors, making the systems more prone to failure and considerably increasing production costs.

SUMMARY

The problem of sensor calibration and reference value or zero-point finding is known to the expert and leads to considerable effort in terms of logistics, labelling and quality assurance in the production of sensors, which in turn increases costs and susceptibility to errors.

Accordingly, there is a need for sensors that can reliably determine the moisture and/or dew point at low energy consumption and reliably find their reference point even in demanding environments. The low energy consumption is of high interest in decentralized applications, small space, in moving systems or in mass markets or in disposable applications where the sensor is only used temporarily (e.g. in a packaging).

The object of the invention is to provide devices and methods for the determination of moisture that operate reliably with low energy consumption and in demanding environments.

For solving this object, the invention according to a first alternative provides a moisture sensor element according to claim 1 and a method for determining moisture according to claim 12. A method for producing a moisture sensor element and a moisture and dew point sensor including such a moisture sensor element are the subject of the further independent claims.

Advantageous designs are the subject of the subclaims.

In a first aspect, the invention provides a moisture sensor element for a moisture sensor for measuring a moisture content in a gas, comprising at least one vibrating element and at least one material on the vibrating element, wherein the at least one material is designed in such a way that a mass thereof changes in response to a moisture value.

It is preferred that a first material with a first mass that changes in response to a first moisture value and a second material with a second mass that changes in response a second moisture value are provided.

It is preferred that the first material and the second material are disposed on the same side or on opposite sides of the at least one vibrating element.

It is preferred that the first material and the second material are disposed on the same area or on different areas of the at least one vibrating element.

It is preferred that the first material and the second material are disposed side by side, one above the other or in an annular or surrounding arrangement.

It is preferred that the first material and the second material are disposed on different tines or on the same tine of a vibrating element designed as tuning fork.

It is preferred that the at least one material is a porous material in which the pore sizes are chosen and distributed in such a way that the mass changes rapidly in response to moisture changing over a range of a moisture value.

It is preferred that the at least one material is a porous material in which the deviation of the pore size of the pores from the medium pore size of the material is chosen in such a way that the mass changes rapidly in response to moisture changing over a range of a moisture value.

It is preferred that the at least one material is a defined-porous material.

It is preferred that the first and the second material are different
- by their average pore diameter and/or
- by their wettability and/or
- by being provided in quantities which contain a significantly different pore volume and/or
- by their capability to absorb light or infrared or heat radiation.

It is preferred that the at least one material is selected from the group of microporous, mesoporous and macroporous materials.

It is preferred that at least a part of the at least one material is treated with a surface-derivatizing reagent for changing the wettability.

It is preferred that at least a part of the at least one material is treated with an organosilane or organosiloxane as surface-derivatizing reagent for changing the wettability.

It is preferred that at least a part of the at least one material is provided or treated with an additive for changing the radiation absorption capability towards light or infrared or heat radiation.

It is preferred that the at least one vibrating element is designed as quartz crystal microbalance and/or as quartz crystal tuning fork.

In a further aspect, the invention relates to a method for producing a moisture sensor element according to one of the preceding configurations, the method comprising:
a) providing a vibrating element and
b) coating the vibrating element with at least one material the mass of which rapidly changes with moisture changing over a moisture value, wherein b) comprises:
b1) applying a precursor material to the vibrating element and
b2) creating pores in the precursor material to form the material the mass of which rapidly changes with moisture changing over a moisture value.

In a further aspect, the invention relates to a moisture sensor for determining the moisture content in a gas, the sensor comprising a housing with at least one opening, a moisture sensor element, preferably according to one of the preceding configurations, inside the housing, and an electronic component for driving the vibrating element and for providing a measurement signal.

Preferably, a sensor element with a non-linear characteristic is provided. This allows at least one non-linearity in the characteristic curve to be used to determine a reference point, for example. Particularly preferably, a sensor element is provided the characteristic curve of which (signal plotted over (relative) moisture in the gas) exhibits at least a first non-linearity and a second non-linearity, the sensor being designed to create at least one reference point based on the first non-linearity and on the second non-linearity. Particularly preferably, the distance between the non-linearities and/or a relationship of the non-linearities is used for the determination of the reference value and/or for calibration.

According to another alternative for solving the above-mentioned object, which may be alternative or cumulative to the use of the non-linear sensor element, the sensor is closed at its opening with a membrane which is gas-permeable but water-impermeable.

Such membranes can allow gas and water vapor to pass to the interior of the housing and to the sensor element, but can keep water away from the housing. This allows the sensor to work reliably even in environments with splash water or similar.

Materials for such membranes have been known for years as fabrics for outdoor clothing, for example, and are available on the market for functional clothing or outdoor clothing.

According to yet another alternative, which may provided in addition or as an alternative to the non-linear sensor element and/or the opening having the gas-permeable but water-impermeable membrane, a sensor element is used which has at least one vibrating element provided with a first coating and a second coating, the first coating and the second coating having a different wettability relative to water. For example, the first coating is hydrophilic and the second coating is hydrophobic.

For this purpose it is provided, for example, that the at least one vibrating element comprises at least one material which may or may not be said at least one material with non-linear behavior, and that at least part of the at least one material is treated with a surface-derivatizing reagent to change its wettability.

It is preferred that the housing contains a temperature control element for influencing the temperature of the at least one material.

It is preferred that the housing contains a heating element for influencing the temperature of the at least one material.

It is preferred that the housing contains a light, infrared or heat radiation source for irradiating the at least one material with light, infrared or heat rays.

In particular, it is preferred, or in an alternative of the invention, also provided independently without said at least one material with non-linear characteristics and/or also alone without the gas-permeable membrane that the housing contains an LED component for irradiating at least one material on a vibrating element with light, infrared or heat rays.

The use of an LED together with a low mass of a vibrating element leads to that the sensor can operate across a temperature range in a particularly energy-efficient manner, and thus a dew point can be determined. Particularly preferably, this is provided together with the at least one material with the non-linear characteristic so that when the temperature range is passed, the location(s) of the at least one non-linearity is(are) also detected and can be used for reference point determination and/or for calibration.

It is preferred that the housing is metallic.

It is preferred that the housing has a planar surface vis-a-vis the at least one vibrating element.

It is preferred that the housing has a thermal mass which is more than 1000 times higher than the thermal mass of the at least one material applied to the at least one vibrating element.

It is preferred that the housing is closed at its opening with a vapor-permeable but watertight membrane.

In a further aspect, the invention relates to a dew point sensor for determining the dew point in a gas, the sensor comprising a moisture sensor according to the above configurations, wherein the electronic component is designed to provide a measurement signal allowing to determine the dew point.

In a further aspect, the invention relates to a moisture-measuring method for measuring a moisture in a gas, the method comprising:

a) using a moisture sensor element, wherein the course of the measurement signal thereof has a least one non-linearity according to the moisture, and determining a reference value based on the at least one non-linearity, and/or b) using a housing with an opening which is closed with a gas-permeable but water-impermeable membrane, and/or c) using at least one vibrating element having regions with different water-wettability, in particular a hydrophilically coated region and a hydrophobically coated region.

Preferably, the moisture-measuring method comprises: using a moisture sensor element, wherein the course of the measurement signal thereof has a first non-linearity and a second non-linearity according to the moisture, and determining the reference value by comparing the first non-linearity and the second non-linearity.

Preferably, the moisture-measuring method comprises: using a moisture sensor element according to one of the above designs or a moisture sensor element obtainable by the above-described production method or a moisture sensor according to one of the above designs.

Preferably, the moisture-measuring method comprises: utilizing two or more rapid changes in the vibration behavior of the at least one vibrating element for reference value determination and/or for calibration.

Preferably, the moisture-measuring method comprises: heating the at least one vibrating element and detecting one or more rapid changes in frequency of the vibrating element occurring during heating.

Preferably, the moisture-measuring method comprises: multiple heating of the at least one vibrating element and detecting changes in frequency of the at least one vibrating element during the cooling phase or cold phase between two heating processes, wherein in particular it is detected whether and to what extent these changes in frequency decrease as the number of heating/cooling phases increases and wherein the moisture or the dew point is determined from the decrease in this change.

Embodiments of the invention enable sensors which can reliably determine the dew point at low energy consumption and thereby reliably find their reference point even in demanding environments. Due to the low energy consumption, the sensor is advantageous for decentralized applications, where space is limited, in moving systems or when used in mass markets or in disposable applications where the sensor is only used temporarily (e.g. in a packaging).

Aims of embodiments of the present invention are to reduce to a minimum or to circumvent completely one or more disadvantages of known systems.

A sensor according to a preferred design comprises at least one vibrating element, two or more additional materials which are preferably defined-porous, an optional heating element or an infrared or light emitting element and an electronic component.

Accordingly, a particularly preferred sensor comprises:
i) at least one vibrating element,
ii) two or more additional defined-porous materials,
iii) an optional heating element or an infrared or light emitting element,
iv) and an electronic component and
v) a housing with at least one opening.

Preferred embodiments of the sensor or its sensor elements exhibit a non-linear behavior toward gases with a different relative moisture.

It is preferred that one or more of the defined-porous materials are created on the vibrating element in two steps, wherein a substantially non-porous layer of a precursor material is applied in a first step and the pores are produced in a second step.

Preferably, two or more defined-porous materials are provided which differ
i) in their pore diameter or
ii) in their wettability if the pore diameters are equal.

In preferred embodiments, the defined-porous materials are present in quantities which contain a clearly different pore volume.

Preferably, the defined-porous materials are from the group of micro-, meso- and macroporous materials.

Preferably at least one defined-porous material is provided, part of which has been treated with a surface-derivatizing reagent to change its wettability.

Preferably the surface-derivatizing reagent is an organosilane or organosiloxane.

A sensor is preferred, which comprises an infrared or light-emitting element, wherein an additive is present in the at least one material, preferably in one of several defined-porous materials, wherein the additive changes the radiation absorption properties of the material with respect to light or infrared irradiation.

In such a sensor it is further preferred that at least two layers of defined-porous materials are provided on top of each other.

The preferred sensor element is a sensor element with a vibrating element on the basis of a quartz crystal microbalance.

The preferred sensor element is a sensor element with a vibrating element on the basis of a quartz crystal tuning fork.

The preferred sensor is a sensor with a water-vapor permeable and waterproof membrane across the opening in the housing.

The preferred sensor is a sensor with a metallic housing, the housing having a planar surface vis a vis the vibrating element and the thermal mass being more than 1000 times higher than the thermal mass of the defined-porous material deposited on the vibrating body.

The preferred method is a method for determining the dew point using a sensor according to one of the designs described above and using two or more rapid changes in the vibration behavior.

Preferably, in the method, the vibrating element is heated at least once, and two or more rapid changes in frequency of the vibrating element are detected.

Preferably, in the method, the vibrating element is heated several times in a row, and the change in frequency of the vibrating body during the cooling or cold phase between two heating cycles is detected.

Preferably, the above-mentioned changes in frequency decrease as the number of heating/cooling phases increases, the moisture or the dew point being determined from the decrease of these measurement values.

Embodiments of the invention enable a small mobile dew point sensor that is preferably designed as a reference point sensor.

Preferably, a mobile energy supply such as a battery or rechargeable battery and/or an energy harvester is provided, which can generate energy for operating the sensor from ambient energy such as heat, vibration, radiant energy, electric fields, etc.

Preferably, the electronic component is designed for wireless communication. In particular, it has at least one transmitter for wireless transmission of the sensor signal. In particular, a transceiver for bidirectional wireless communication is provided.

A special aspect of the embodiments shown here concerns the creation of a reference point. While in the entire prior art the aim is to obtain characteristic curves that are as linear as possible, an alternative of the present invention provides for the use of a sensor element in which the characteristic curve has at least one non-linearity, preferably at least a first and a second non-linearity. This can be produced, for example, using a vibrating element to which one or more materials are applied which exhibit an abrupt change in mass when the moisture of the gas surrounding the vibrating element exceeds a predetermined value. One example of this is a porous material in which as many pores as possible have essentially the same pore size—pore diameter. A large proportion of the pores therefore have the same pore size, in particular the same pore diameter. Such materials are referred to here as defined-porous materials. Due to pore condensation, there is a step in the adsorption curve for such materials. For the theoretical basics of this reference is made, for example, to:

Schreiber, Andreas: "Phasenverhalten reiner Stoffe in mesoporosen Silika-Materialien", Doktorarbeit, Technische Universitat Berlin, Fakultat II—Mathematik and Naturwissenschaften, 18. Juli 2002, https://depositonce.tu-berlin.de/bitstream/11303/867/1/Dokument_27.pdf ("Phase behavior of pure substances in mesoporous silica materials", doctoral thesis, Technical University Berlin, Faculty II—Mathematics and Natural Sciences, Jul. 18, 2002, https://depositonce.tu-berlin.de/bitstream/11303/867/1/Dokument_27.pdf).

Preferably, a tuning fork is used as vibrating element. In one configuration, more than one tuning fork may be provided. Preferably, the vibrating parts of said or more tuning forks are coated with a defined-porous material.

Normally, as the moisture content increases, more and more moisture condensates on the tuning fork, which results in a continuous increase in mass. If, on the other hand, one has a material with pores with a sufficiently narrow pore size distribution—the material described here as defined-porous material—a gradual increase in mass occurs at a certain relative moisture due to the pore condensation which then occurs. For this purpose, for example, the temperature can be continuously lowered so that the relative moisture of the gas constantly increases and the step can be observed at one temperature value. This step can be used to form a reference value. This allows to calibrate the sensor and to use the mass measurement, which takes place via a frequency measurement, for the determination of the relative moisture.

According to preferred embodiments of the invention, a device and method for dew point determination are proposed. The device can be based on a pair of tuning forks, one of which is porous and has a hydrophilic coating, preferably a monodisperse particulate coating, and the reference has a hydrophobic, non-porous coating. Although not necessary, the housing can be heated or cooled via a Peltier element, for example, but preferably via a simple spotlight such as LED or similar. This can allow the dew point to be determined within a very short time, as water would condense in the porous hydrophilic part, and can thus cause significant changes in mass, while a hydrophobic, non-hydrophilic reference tuning fork would allow easy compensation against drift and pressure fluctuations etc.

Preferably, the at least one vibrating element, e.g. one or more tuning fork(s), is accommodated in a housing whose thermal mass is massively higher than that of the tuning fork, which is then (almost) in thermal equilibrium with the housing due to its proximity to the housing wall and the rather slow gas flow and can thus be easily brought to a certain temperature. When heating up or cooling down, the tuning fork would always be "a little behind", so that water could be condensed first on the inside of the housing and then transferred to the tuning fork as steam by rapidly heating up the wall. This would also make "concentrations" conceivable.

A particularly preferred design of the sensor has a vibrating fork or a Q-based sensor element with a non-linear response profile; preferably without a Peltier element, optionally with a light emitting diode for periodically, almost adiabatically heating the Q. Compared to a Peltier as heating element, the response time of an LED is much shorter and its energy demand much lower.

Preferably, the use of a sub-micron material on the vibrating part with pore condensation leads to a very sharp response curve (wt. % water in the material) in existing boundary moistures. Especially by choosing two or more such pore condensation materials, it can be detected, without cooling, when a limit value in humidity or also dew point is approached, reached and exceeded. When using a range of materials, this provides a stair-like function with a simple detection and very easy "retrieval" of the exact base values, as the steps of the stair can now be of different heights. This results in an inherent retrieval of certain reference values, especially when used in demanding environments such as complex gases, pressure changes, temperature jumps, frequent regeneration or cleaning.

Preferably, the sensor element has a non-linear response profile. Preferably, several "zeolites" are provided on a Q or on a vibrating element. Another preferred concept concerns the use of a series of pore condensation materials in varying quantities for rapid internal retrieval of reference values. While practically all previously known dew point sensors have a cooling element, a LED is used in the preferred design. In another concept, a gas-permeable water-repellent membrane is provided at the sensor opening.

The aim of all these concepts, either individually or in any combination, are low energy/power requirements, the detection of a critical moisture range, operation in difficult environments, approaching a particular point, exceeding that point, and robustness.

A preferred embodiment of the invention relates to the measurement of the dew point in a gas, the embodiment comprising a vibrating element, one or more porous material (s) with a defined pore width, and optionally a heating element or an IR or light emitting element. Preferably, the sensor is characterized by a non-linear response behavior to changes in moisture in the gas, wherein when a certain temperature is reached at a certain humidity or a certain dew point on the material, the mass decreases rapidly. The use of different quantities of materials on the sensor allows a clear assignment of the absolute moisture, since the abrupt changes in mass can be clearly assigned to a specific humidity. Furthermore, a measuring method for the determination of the dew point and moisture is described, which is characterized by robustness and low energy consumption.

Preferred embodiments of the invention provide a small mobile dew point sensor.

Preferred embodiments of the invention relate to a reference point sensor whose characteristic curve has at least one non-linearity, said reference point sensor being arranged to determine a reference point based on the at least one non-linearity.

Preferred embodiments of the invention provide a dew point sensor with low energy consumption.

In practically all moisture sensors used so far, a characteristic curve is desired which is as linear as possible. Precisely in the case of micro balance sensors in which the increases in mass are detected via a vibrating element, there are often deposits on the vibrating element which lead to a change in vibration behavior and thus to a drift. It is therefore often necessary to recalibrate or treat or even replace the sensor. In contrast, embodiments of the invention aim at deliberately generating at least one non-linearity in the characteristic curve and using this at least one non-linearity for reference point generation and calibration. Thus, the sensor can be used for a long time and accurately even in environments where increased deposits are to be expected.

Preferably, the dew point sensor is used for detecting a limit value or threshold in order to produce an alarm signal. For example, the sensor is intended for use in gas-filled systems such as electrical high-voltage systems. Accordingly, embodiments of the invention also concern a gas-filled system or a high-voltage system with a sensor according to one of the above-described designs.

Until now, SF6 has been used as a filling gas in high-voltage systems to prevent overvoltages. SF6 is a climate-damaging gas, which is also classified as a harmful gas. Therefore, alternatives to replace SF6 are increasingly being sought. Many substitute gases are based on ketones. The substitute gases can recombine and be consumed. This effect is enhanced under humid conditions.

To monitor the condition of the gas in the switchgear, it is therefore helpful to monitor the dew point.

Another or additional of use of the sensor in addition to threshold detection for creating switching criteria or for producing alarm signals is the counting of events, for example, how often the dew point exceeds or falls below a certain threshold.

A further possibility of use is the detection of moisture in a gas.

It is possible, for example, to monitor the water content in a petrochemical plant.

Preferably, several non-linearities, e.g. several steps, are generated in the characteristic curve by using several different materials on the vibrating element. This allows one or more reference values to be found by searching one or more steps in the characteristic curve.

Preferably, the characteristic curve has a first and a second non-linearity. The relationship between the steps is a very robust value even under harsh environmental conditions. Accordingly, in one embodiment, the sensor is adapted to monitor the relationship between a first step in the characteristic curve and a second step in the characteristic curve. If this relationship changes (e.g. beyond a certain tolerance), this indicates an error. Accordingly, the sensor can be configured to output a corresponding error signal.

To measure the dew point, the sensor preferably includes a temperature detection device for detecting the temperature and/or a temperature control element for adjusting and/or changing the temperature of the vibrating element. A simple radiating element such as in particular an infrared or light emitting element, preferably designed as LED, is used for this purpose.

The steps can be found via a change in temperature, for example.

The non-linearities are preferably generated via pore condensation. Porous materials with defined pore sizes are preferably used for this purpose.

BRIEF DESCRIPTION OF THE DRAWING

One embodiment of the invention will be described in more detail with reference to the attached drawings wherein it is shown by:

FIG. 3a a top view of a third embodiment of the sensor element;

FIG. 3b a lateral view of the sensor element of FIG. 3a;

FIG. 4a a top view of a fourth embodiment of the senor element;

FIG. 4b a lateral view of the sensor element of FIG. 4a;

FIG. 5a a top view of a fifth embodiment of the sensor element;

FIG. 5b a lateral view of the sensor element of FIG. 5a;

FIG. 6a a top view of a sixth embodiment of the sensor element;

FIG. 6b a lateral view of the sensor element of FIG. 6a;

FIG. 9a a perspective view of another embodiment of the moisture sensor in which the opening is closed by a gas-permeable but water-repelling membrane;

FIG. 9b a section through an area of the opening of the sensor of FIG. 8a; and

DETAILED DESCRIPTION

Figure 1:
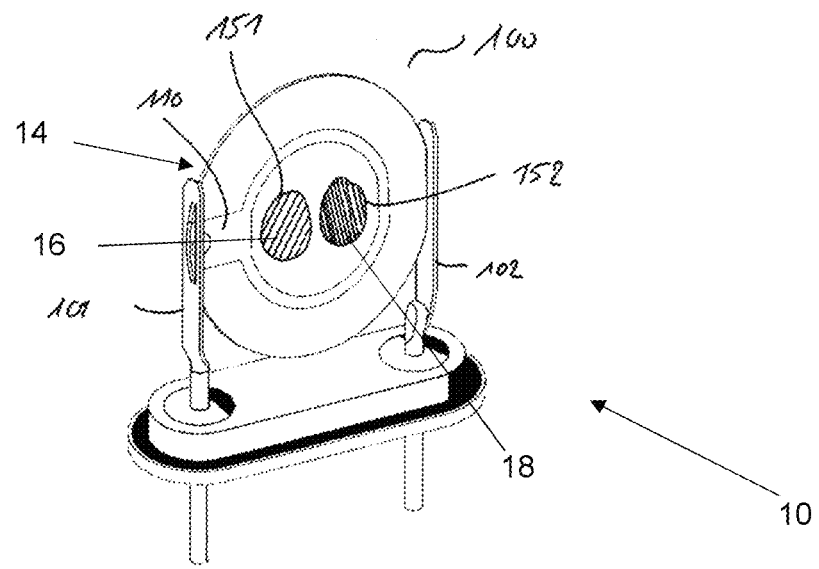
FIG. 1 a perspective view of a first embodiment of a sensor element for a moisture sensor for measuring a moisture content in a gas, the sensor element comprising at least one vibrating element and at least a first material and a second material on the vibrating element.

FIGS. 1 to 6b show various embodiments of a sensor element 10 for a moisture sensor 12. The sensor element 12 has at least one vibrating element 14 that can be made to vibrate. On the at least one vibrating element 14, a first material 16 and a second material 18 are provided. In a preferred embodiment, at least one of the materials 16, 18 is designed in such a way that a mass changes rapidly in response to moisture changing over a range of a moisture value.

Figure 8:
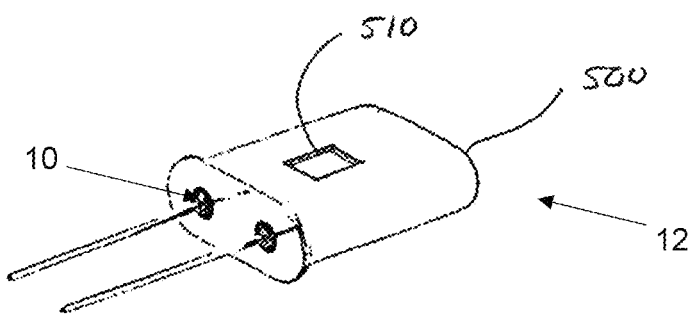
FIG. 8 a perspective view of one embodiment of a moisture sensor with a housing and an opening of the housing, in the interior of which one of the sensor elements of FIGS. 1 to 6b is accommodated.
Figures 9A, 9B:
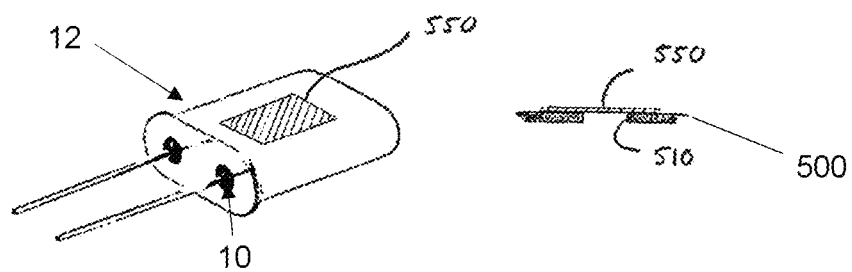
Figure 10:
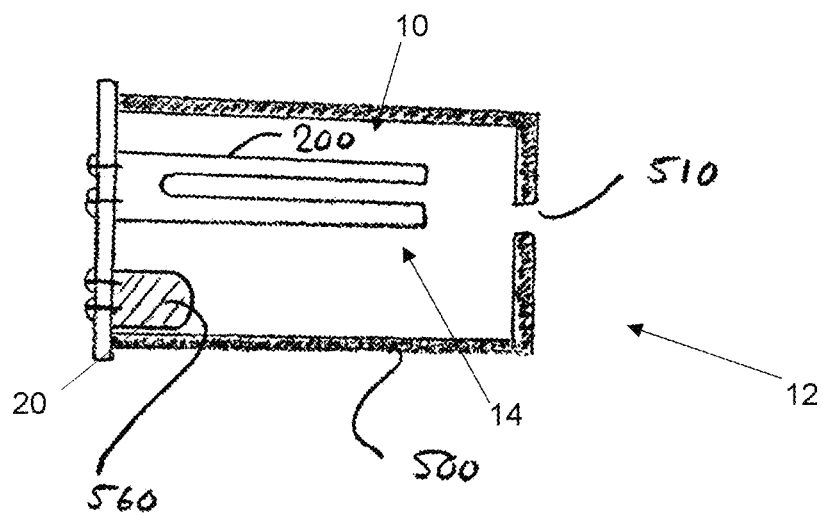
FIG. 10 a section through a housing of another embodiment of the moisture sensor.

FIGS. 8 to 10 show various embodiments of a moisture sensor 12 having a housing 500 with an opening 510. At least one vibrating element, preferably at least one vibrating element 14 of the type shown in FIGS. 1 to 6b, is accommodated in the housing 500. Further, the moisture sensor 12 comprises an electronic component not shown in the drawings and a temperature control element 20 for temperature control of the vibrating element 14. The opening 510 can be closed with a gas-permeable membrane. The temperature control element 20 is preferably designed as radiating element 560 for irradiating the vibrating element 14 with heat or infrared radiation and/or light.

In one embodiment of the moisture sensor 12, the at least one vibrating element 14 is coated in different regions with materials with different wettability. This can also be done in such a way that one vibrating element or a region thereof is coated with a hydrophilic material and another vibrating element or a region thereof is provided with a hydrophobic coating.

In the embodiment of the sensor element 10 according to FIG. 1, a quartz crystal vibrating element 100 with two carriers 101 and 102 is provided as vibrating element 14, said carriers also serving as electrodes. A metal electrode 110 is also visible in this view. The quartz vibrating element 100 contains as first and second material 16, 18 two defined-porous materials 151 and 152 which are mounted on the quartz vibrating element 100 next to each other with (or without) a distance to each other. A concentric arrangement (not shown), in which the first material 16 surrounds the second material 18 e.g. annularly completely or even only partially, is also conceivable.

Figure 2:
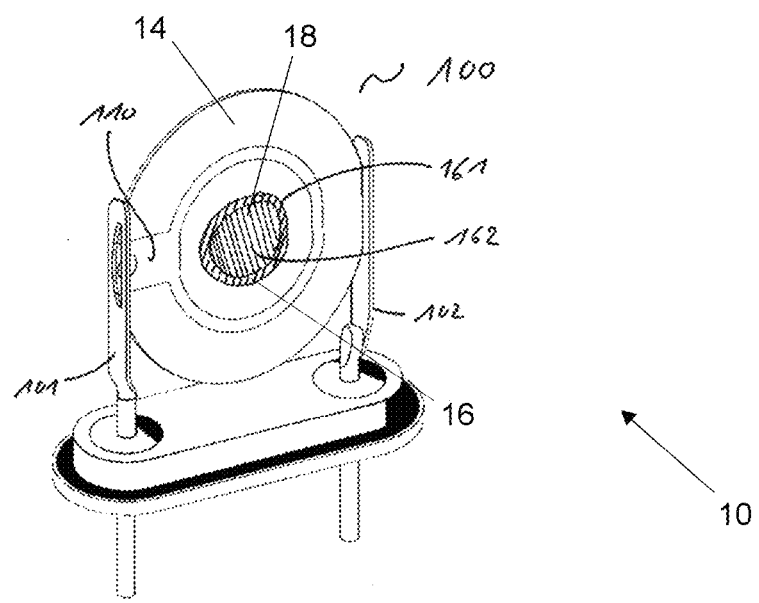
FIG. 2 a perspective view of a second embodiment of the sensor element.

FIG. 2 shows a further embodiment of the sensor element 10 with the quartz vibrating element 100 as vibrating element 14, wherein again two defined-porous materials 161 and 162 are provided as first and second materials 16, 18, which here, however, are partially mounted one above the other on the quartz vibrating element 100.

FIG. 3 shows a further embodiment of the sensor element 10, wherein a quartz tuning fork 200 in top view (FIG. 3*a*) and in side view (FIG. 3*b*) with holder 202 (left) and vibrating region 204 is provided as vibrating element 14. Both arms 210, 220 of the tuning fork 200 are coated with corresponding electrodes that are connected to the holder 202 by suitable soldering joints 211 and 221. Two defined-porous materials 301 and 302 are applied as first and second material 16, 18 to the same arm 220 of the quartz tuning fork 200.

FIG. 4 shows a further embodiment of the sensor element 10 having the quartz tuning fork 200 with two defined-porous materials 303 and 304 which are applied to both arms 210 and 220.

FIG. 5 shows a further embodiment of the sensor element 10 having the quartz tuning fork 200 with two defined-porous materials 305 and 306 which are applied to the same arm 220 in an overlapping manner.

FIG. 6 shows a further embodiment of the sensor element 10 having the quartz tuning fork 200 with two defined-porous materials 307 and 308 which are applied to the same arm. A first material 307 is applied to the front and second material 308 is applied to the rear.

FIG. 8 shows one embodiment of the moisture sensor 12 having the housing 500 with the opening 510 through which the environment can interact with the coated vibrating element 14, in particular with the quartz 100, 200 (not shown in FIG. 8, in the housing).

FIG. 9 shows the same housing 500 with a membrane 550 fitted across the opening 510 (concealed, not visible). In addition to the side view (FIG. 9*a*, left), a cross-section through the opening 510 with diaphragm 550 fitted over it is shown (FIG. 9*b*, right).

FIG. 10 shows a further embodiment of the moisture sensor 12 with the housing 500 with the quartz tuning fork 200 and one of the above-mentioned coatings (for the sake of clarity not shown in detail), the opening 510 and a light or infrared emitting element 560.

It is obvious that other variants can be used. Depending on the design, more than two materials 16, 18 can be used or these materials 16, 18 can be applied to the same side or to the same vibrating arm 210, 220 or to different vibrating arms 210, 220 and opposite sides of the vibrating element 14.

A variety of systems are suitable as vibrating elements 14, which are known to the expert and have been described above. Preferred vibrating elements 14 are based on vibrating quartz or quartz tuning forks and contain at least one piezoelectric material and at least two electrodes. Suitable vibrating elements 14 are therefore also quartz oscillating crystals, such as those used in quartz crystal microbalances.

Defined-porous materials 151-162, 301-308 exist in a wide variety of materials and are characterized by the fact that the materials have pores with a narrowly defined diameter. According to the International Union of Pure and Applied Chemistry, IUPAB, a distinction is made between microporous (pore diameter less than 2 nm), mesoporous (pore diameter between 2 and 50 nm) and macroporous (pore diameter greater than 50 nm) materials.

The material class of zeolites and metal-organic framework (MOF) materials belongs mainly to the microporous materials.

The material class of the MCM-41 (Mobil Composition of Matter No. 41) and SBA-15 materials includes mesoporous materials, wherein the pore size can be adjusted by special selection of the synthesis conditions.

In general, porous glasses with pores from 2 to 1000 nm can be produced by a variety of methods, the extraction of alkali borosilicate glasses after a phase separation probably being the best-known method. Such glasses are commercially available under the name Vycor glasses.

The measurement of pore diameters is sufficiently well known to the expert and can be performed either directly by suitable microscopic methods such as electron microscopy or indirectly by determining the specific surface area of a material by an absorption method and calculating the pore diameter. A frequently used method is the absorption of nitrogen (N2) at −196° C., the so-called Brunauer-Emmet-Teller (BET) method. This can be done using devices such as a TriStar or Gemini, as commercially distributed by the company Mikromeritics. This allows the specific surface area of the sample to be determined and the mean pore diameter and pore size distribution to be calculated. The procedure is sufficiently well known to the expert. For further details on the porous materials, reference is also made to the above-mentioned doctoral thesis.

To distinguish between porous materials and defined-porous materials, the so-called pore size distribution is used: Here the pore volume fraction (y-axis; units: cm3/g per nm or angstrom) is plotted against the pore diameter (x-axis; units: nm or angstrom). A material is defined-porous if the following two conditions apply:

The width of the peak in the above illustration at half height of the peak (full width at half height; units: nm or angstrom) is less than one quarter of the mean pore diameter (units: nm or angstrom) as determined by the BET method.

The pore volume (units: cm3/g) within the width of the peak (integral of the pore volume fractions from the lower end of the width of the peak at half height to the upper end of the width of the peak at half height) is at least one fifth (20%) of the total pore volume (units: cm3/g) of the material.

To determine the total pore volume of the material, pores having a diameter from zero to ten times the average pore diameter are considered. For this purpose, the integral of the pore volume fractions from zero to 10 times the mean pore diameter is determined in the above representation of the pore size distribution.

The first material 16 and the second material 18 in the defined-porous materials 151, 152; 161, 162; 301, 302; 303, 304; 305, 306; 307, 308 can differ in pore diameter. In this case, the differentiation is purely by the pore diameter while the material composition is the same. As an alternative or additionally, two defined-porous materials 151, 152; 161, 162; 301, 302; 303, 304; 305, 306; 307, 308 can be defined by the selection of the substances of which they are composed or by the coating of the inner side of the pores. In these cases, the pore diameter of different materials 16, 18; 151, 152; 161, 162; 301, 302; 303, 304; 305, 306; 307, 308 can be identical, provided that these materials 16, 18; 151, 152; 161, 162; 301, 302; 303, 304; 305, 306; 307, 308 do not differ in their wettability. Such different wettabilities are known to the expert and are referred to as hydrophilic or hydrophobic materials 16, 18. The wettability is often quantitatively determined by the so-called contact angle. For this purpose, devices such as the DAS 100 from Kruss or the Theta device from Biolin Scientific are used.

Two or more different materials 16, 18, in particular two or more defined-porous materials 151, 152; 161, 162; 301, 302; 303, 304; 305, 306; 307, 308 can be applied to the vibrating element 14 in numerous arrangements and variable quantities. The materials 16, 18; 151, 152; 161, 162; 301, 302; 303, 304; 305, 306; 307, 308 can be applied in one or more process steps, wherein also additional process steps may be involved depending on the specific design.

Suitable methods for applying especially the defined-porous materials 16, 18; 151, 152; 161, 162; 301, 302; 303, 304; 305, 306; 307, 308 include spin-coating of suitable dispersions or dispersions of precursor materials. The layers are solidified preferably by heating or are given their actual form of use in an additional processing step. Application methods which are also suitable are coating by gas phase or plasma coating, whereby typically a precursor layer is applied first and later the actual form of use of the defined-porous material 151, 152; 161, 162; 301, 302; 303, 304; 305, 306; 307, 308 is obtained by an additional processing step. As an option, auxiliary materials known to the specialist and containing binders or adhesives can be used to improve adhesion.

Particularly suitable methods employ the deposition of one or more drops of a dispersion of the materials 151, 152; 161, 162; 301, 302; 303, 304; 305, 306; 307, 308 or dispersions of the precursor materials on the vibrating element 14, the individual drops being applied at the place or at different places on the vibrating element 14.

In a simple form of execution, which is shown in particular in FIG. 1 and FIG. 3, two or more materials 151, 152; 301, 302 are applied side by side to the vibrating element 14, and the regions with the coatings may touch each other or even overlap or be clearly separated by non-coated regions. Such an arrangement is shown, for example, in FIG. 1 where the materials 151 and 152 are applied side by side to the vibrating element 14.

In another simple form of execution, two or more materials 161, 162; 305, 306 are applied one on top of the other to the vibrating element 14. In this case, also additional processes can be used between the individual steps, such as heating the vibrating element or using an extraction solution for converting a precursor material into a defined-porous material. Such an arrangement is shown in FIG. 2 or FIG. 5. The two materials 161, 162; 305, 306 are arranged one on top of the other.

When using overlapping layers or superimposed layers of materials 161, 162; 305, 306, it is advantageous to deposit the layer with the smaller pore diameter first on the vibrating body of the vibrating element 14. Concerning the arrangement shown, for example, in FIG. 2, the preferred selection of the materials 161 and 162 is such that material 161 placed closer to the vibrating element 14 has a smaller pore diameter than the material 162 placed above it.

When using different materials with similar pore diameters, it is advantageous to deposit the more hydrophilic material on the vibrating body of the vibrating element 14 beforehand.

The arrangement of the individual coated regions of the vibrating body of the vibrating element 14 can be symmetrical or asymmetrical with regard to the shape of the vibrating body.

The quantity and size of the individual coated regions can vary greatly.

The height, form and extent of the coated regions can vary greatly.

In a preferred embodiment, the quantities of defined-porous materials 151, 152; 161, 162; 301, 302; 303, 304; 305, 306; 307, 308 used are different.

In a preferred embodiment, the quantities of materials used are chosen in such a way that the pore volume that can be filled by water clearly differs from each other.

In a particularly preferred embodiment, the pore volume of the material with the smallest pore diameter is clearly smaller than the pore volume of the material with the larger pore diameter.

In a preferred embodiment and when using materials having a similar pore diameter, the pore volume of the more hydrophilic material is clearly smaller than the pore volume of the less hydrophilic material.

In this case, the material is preferably produced in two steps in which a precursor material is applied to the vibrating body of the vibrating element 14 first (step 1) and then a part of the precursor material is converted into a material with different wettability in a further process step.

Particularly preferred materials in this case are silicate-based micro- or mesoporous materials and macroporous glasses, a part of which is converted into a material with different wettability by a surface modification step.

Suitable reagents for changing the wettability of the pores are sufficiently known and include the class of organosilanes, organoboranes, surface active substances, amphiphilic polymers and numerous other materials.

Particularly suitable groups of materials for changing the wettability are trimethoxy silanes commercially available from the company Gelest, for example.

A suitable combination of mesoporous materials is based on defined-porous silicate materials like MCM41 and derivatized organotrimethoxy silanes.

Suitable organosilanes are alkyl and aryl trimethoxysilanes for lowering the wettability of the defined-porous materials to water.

Suitable organosilanes with amine, ammonium, carboxy, sulfonate, phosphonate, polyglycol, polyglycerol or polyacrylate functionality are suitable for improving the wettability of defined-porous materials.

The use of ionic organosilanes or organosilanes that allow salt formation can be used in preferred variants to change the wettability.

The use of ionic organosilanes is advantageous for sensors with fast response to changes in moisture or dew point.

When three and more materials are used, it is advantageous if the proportions of the material quantities of the individual materials are different.

When three and more materials are used, it is advantageous if the quantity of pore volume of the material with the smallest pore diameter is the smallest.

When using three and more materials and when using materials with similar pore diameter, it is advantageous if the quantity of the pore volume of the most hydrophilic material is smallest.

Optional heating elements are known to the expert and include resistive heating elements based on platinum.

Optionally, the vibrating element can be periodically heated by an infrared or light emitting element 560. This is shown, for example, in FIG. 7, with a voltage to be applied to the light-emitting element in the lower part and a typical frequency signal of the vibrating element 14 in the upper part.

The use of an infrared or light emitting element 560 is advantageous in certain designs.

The length of the heating phases, the power and the frequency of the heating intervals depend on the application field of the sensor and can be optionally adjusted via the electronics.

The length of the irradiation, the power and the frequency of the irradiation depend on the application field of the sensor and can optionally be adjusted via the electronics.

The use of a light emitting element 560 in a partially transparent housing 500 or in a housing 500 with an opening 510 can also be used to provide a user with information about the operation or operating status of the sensor 12.

The parameters of the irradiation or heating of the vibrating element 14 are adapted in a preferred version to the previously determined measured values of the sensor 12.

The duration and intensity of the irradiation of vibrating element 14 is preferably higher under rapidly changing moisture conditions than under comparatively constant moisture conditions.

When detecting an increase in relative moisture in a gas mixture, the duration and intensity of the irradiation of the vibrating element 14 is shorter than when the relative moisture in a gas mixture decreases.

The selection of the defined-porous materials 151, 152; 161, 162; 301, 302; 303, 304; 305, 306; 307, 308, the number of the materials 151, 152; 161, 162; 301, 302; 303, 304; 305, 306; 307, 308 used and the selection of a heating element or an infrared or light emitting element 560 depends on the application field of the sensor 12.

Sensors 12 of the type described here with at least one material which due to its pore distribution or other properties ensures at least one non-linearity in the response behavior are particularly suitable for reliably finding the zero point or retrieving a reference point. Such sensors are especially suitable for long-term monitoring, as they are less or not susceptible to drift of the sensor signal.

Heating or irradiation of the vibrating element 14 leads to one or more successive changes in the vibration behavior of the vibrating element 14.

Changes in the vibration behavior of vibrating element 14 are read out by the electronics. The procedures, calculation and evaluation methods as well as circuits used for this purpose are known to the expert e.g. from prior art cited above. In suitable vibrating elements 14, the changed vibration behavior can be easily converted into a mass change of the vibrating element 14.

As a result of heating or irradiation, the electronics deliver one or more successive mass changes of the vibrating element 14, the mass change not occurring continuously but rather abruptly.

In a preferred embodiment, the vibration behavior of the vibrating element 14 is evaluated in such a way that a distinction is made between areas in which no sudden change in mass occurs (continuous areas) and areas in which a sudden change in mass occurs (erratic areas).

The differentiation into these two areas allows a simplified data analysis of the sensor signal by using continuous areas to define a baseline correction (linear drift). After deducting the baseline correction, the start and end points of an erratic area are more strongly defined and thus the measurement signal is more accurate.

The relative size of two or more erratic areas depends on the materials used 151, 152; 161, 162; 301, 302; 303, 304; 305, 306; 307, 308 on the vibrating element 14.

In a preferred embodiment, information on the pore volume ratios of the materials used 151, 152; 161, 162; 301, 302; 303, 304; 305, 306; 307, 308 is used in the evaluation of the raw data of the electronics to improve the signal quality.

In a particularly preferred embodiment, a number of materials in different quantities with significantly different pore volumes are used. The series of erratic aeras from the raw data can be evaluated in an improved way, since the relative mass changes (height of the jumps) are known and always occur in the same order.

For clarification or illustration, it should be mentioned here that when the relative moisture in an initially dry gas volume increases, a sensor 12 of the type described here containing a pore volume 1 of a first defined-porous material 1 (examples: 151, 161, 301, 303, 305, 307) and a pore volume 2 of a second defined-porous material 2 (examples: 152, 162, 302, 304, 306, 308) and under the conditions $$\text{(pore volume 2)}=3\times\text{(pore volume 1)} \quad \text{(i)}$$

$$\text{(pore diameter of material 1)}<\text{(Pore diameter of material 2)} \quad \text{(ii)}$$

will first exhibit a small jump and then later (at a higher moisture) a further, larger jump in the mass (measured as a rapid change in frequency). The calculated change in mass from the respective rapid changes in frequency is given for such a sensor 12 in good approximation by:

$$\text{(mass change 2)}=k*3*\text{(mass change 1)}.$$

The quality of this correlation can be expressed by the factor "k". For identical materials with different pore diameters the factor "k" is approximately 1. For materials with different wettability, the deviations of the value of k=1 can also be larger and can range from some % to some 10%. In practice, however, this is not a particular disadvantage, as this factor can be included in the calculation method. Of practical use is the fact that this value is constant for the sensor 12, which means that the value is subject to little or no significant drift.

Since the relative magnitude of the two rapid changes is thus known in advance, the raw data from a sensor 12 can be reliably evaluated, even for data with high noise. Corresponding algorithms are known and often used in telecommunications and computer science, for example.

Accordingly, the use of numerous materials leads to series of erratic areas each of which can be detected due to its characteristic size. As a result, a sensor 12 can be heated or irradiated even for a short time in a preferred embodiment. This means that only some of the erratic areas are made visible, and irradiation or heating is more efficient than if all areas were activated.

The use of such series of materials 151, 152; 161, 162; 301, 302; 303, 304; 305, 306; 307, 308 allows the production of sensors 12 with a large range of dew point temperatures or moisture contents.

The use of few materials allows easy production of sensors 12 for monitoring a set point or alarm or limit value.

The energy requirement of the sensor 12 depends on the demands on the sensor, the moisture range, the measuring frequency and other factors.

Preferred sensors 12 for monitoring a huge gas volume with very slow changes of the moisture content are heated or irradiated periodically and can thus retrieve the zero point or reference point and are thus better protected against slow drift of the sensor signal. Such sensors have a very low energy consumption and are especially suitable for places that are difficult to access or for sensors 12 that are powered by solar cells or battery, or sensors 12 that are completely enclosed in another device or room. This is especially advantageous if an environment needs to be especially clean or inaccessible due to toxic components or fire or explosion hazards. The latter areas are of particular interest, as the use of electrical cables is preferably avoided under so-called Ex-conditions.

Sensors 12 for monitoring a limit value are typically used to detect an increase in moisture in an environment and are referred to as monitoring sensors. In a preferred embodiment, the sensor 12 is vibrated only periodically and a decision is made based on its vibration behavior, and on the basis of the vibration behavior it is decided whether no increase in moisture has taken place or whether there is an increase in moisture. In the first-mentioned case, the result (no increase in moisture) can be confirmed by a heating/irradiating step and by the absence of an erratic area. In the case of an increase in moisture, this can be confirmed by a heating/irradiating step and by the detection of an erratic area. The time course of the oscillation behavior after termination of the heating/irradiation step can also be used to determine the magnitude of the moisture increase.

The current consumption of preferred monitoring sensors is low, and the sensors can also provide an indication of the extent to which the limit value has been exceeded in the event of a response (detention of exceeding the limit value). Preferred monitoring sensors therefore have a preferred arrangement of the opening 510 in the housing 500 and of the thermal or irradiation element 560.

Preferred sensors 12 for monitoring rapidly changing moisture conditions preferably comprise a series of materials and are relatively often heated or irradiated.

In a preferred embodiment of the sensor 12, the housing 500 and the arrangement of the vibrating element 14 and the heating or irradiating element 560 are chosen in such a way that a part of the housing 500 serves as a condensation surface during the heating or irradiation step. This part of the housing 500 is preferably arranged close to at least one of the defined-porous materials 151, 152; 161, 162; 301, 302; 303, 304; 305, 306; 307, 308, preferably in an arrangement of parallel surfaces, one surface being defined by the vibrating element 14 and the second surface being defined by the corresponding part of the housing 500.

In this embodiment of the sensor 12, the housing 500 is not only a protection for the vibrating element 14, but also serves as a thermally inert element and temporary cooling unit which can cool water vapor from the defined-porous material 151, 152; 161, 162; 301, 302; 303, 304; 305, 306; 307, 308 and temporarily fixes it in the form of condensate.

After completion of the heating or irradiation phase, the defined-porous material 151, 152; 161, 162; 301, 302; 303, 304; 305, 306; 307, 308 cools down and the water inside the housing 500 will partly again deposit in the defined-porous material 151, 152; 161, 162; 301, 302; 303, 304; 305, 306; 307, 308. Another part of the water can escape to the environment through the opening 510 in the housing. Therefore, the vibration behavior of the sensor 12 can be detected several times before and after a heating or irradiation phase and thus delivers the mass of water in a defined-porous material 151, 152; 161, 162; 301, 302; 303, 304; 305, 306; 307, 308.

Figure 7:
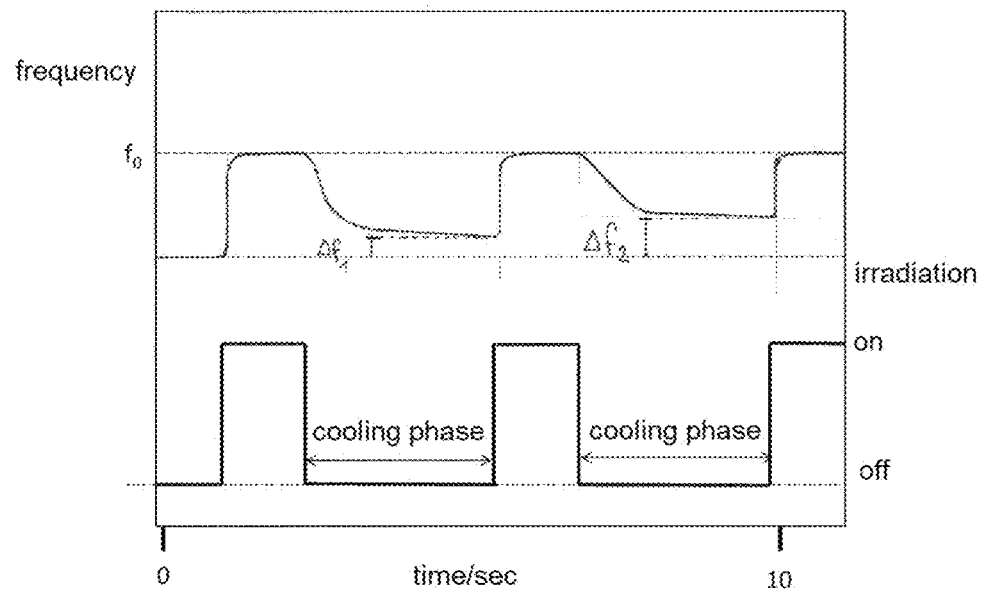
FIG. 7 a diagram showing a frequency signal of a vibrating element according to one of the embodiments of FIGS. 1 to 6b together with a voltage for driving a heating element for heating the vibrating element, plotted over time.

With rapid succession of heating or irradiation phases, the amount of bound water decreases after each heating or irradiation phase. The decrease in mass as a function of the number, type and duration and distance of the heating or irradiation phases can be used as an additional measured parameter to determine a dew point, dew point temperature or moisture. Such behavior is shown in FIG. 7. The vibrating element 14 has a higher frequency (f0) after the start of irradiation. After the end of the irradiation phase, a cooling phase begins. Some of the moisture in the housing 500 is slowly deposited on the vibrating element 14 (frequency drops). Towards the end of the cooling phase the frequency increase becomes slow and almost linear. The difference $\Delta f1$ compared to the frequency of the sensor 12 before the start of the first irradiation phase is characteristic of the geometry of the housing 500, the type of materials and the arrangement and size of the opening 510.

A next heating phase again leads to a very rapid increase in frequency. A cooling phase starts again after the end of the irradiation. The frequency decreases again, but less. The difference $\Delta f2$ with respect to the frequency of the sensor before the start of the first irradiation phase, $\Delta f1$, and optionally other such frequency differences $\Delta f1$ when carrying out further (i−2) irradiation phases are characteristic for a certain moisture, geometry and the housing 500 as well as the length and type of irradiation.

When using the sensors 12 and a light or infrared irradiation element 560, it can be advantageous to provide the defined-porous materials 151, 152; 161, 162; 301, 302; 303, 304; 305, 306; 307, 308 all or some of them with an additive which changes the absorption of the radiation.

Preferred additives to the defined-porous materials 151, 152; 161, 162; 301, 302; 303, 304; 305, 306; 307, 308 are light or infrared absorbing materials.

Preferred additives are mineral or organic pigments or dyes. Suitable materials for absorbing light or infrared radiation are well known and include materials that are commercially available as inks.

The use of suitable additives can serve to reduce the duration and intensity of the heating or irradiation phases. This is of interest because it directly reduces energy consumption.

In a specific design, several materials 16, 18, 151, 152; 161, 162; 301, 302; 303, 304; 305, 306; 307, 308 are arranged on a vibrating element 14, the materials 16, 18, 151, 152; 161, 162; 301, 302; 303, 304; 305, 306; 307, 308 differing in the pore diameter and the content of additives.

In this specific design, pairs of materials 16, 18, 151, 152; 161, 162; 301, 302; 303, 304; 305, 306; 307, 308 where a defined-porous material is used once without and once with the additive.

The use of arrangements with materials 161, 162; 305, 306 on top of each other, as shown in FIG. 2 and FIG. 5, can be advantageous for this special embodiment.

In such special embodiments it can be advantageous to deposit a material 162, 306 with a smaller pore diameter on a material 161, 306 with a larger pore diameter and to place the material with smaller pore diameter in such a way that it comes into contact with the material with larger pore diameter.

In another embodiment of the sensor 12 using a light emitting element 560, the additive is designed to remove the deposit of contaminants on the sensor 12. Suitable materials are known and include titanium dioxide in its anatase crystal form and light emitting elements 560 with light in the blue or ultraviolet range of the spectrum. Such sensors 12 are suitable for use in gas mixtures containing gases or volatile substances that cause deposits on the sensors 12. Examples of such environments that lead to deposits on the sensors 12 are known to the expert and include working environments in the paint and varnish industry, manufacturing technology or other industrial environments where volatile organic compounds occur. Another such environment is found in agriculture or in the processing of food and beverages, where volatile components of organic origin can lead to deposits. Such deposits can then consist of condensed terpene derivatives.

In another embodiment of the sensor 12, further defined-porous materials (e.g. more than two) are placed inside the housing 500. These additional materials support the function of sensor 12 and may improve the accuracy or reliability of sensor 12 in certain environments.

In a preferred embodiment, the opening 510 in the housing 500 of the sensor 12 is equipped with a membrane 550 that protects the sensor 12 against contamination or the penetration of liquids. The gas outside the housing 500 can only interact with the sensor 12 through the membrane 550. The housing 500 is otherwise tightly sealed so that no dirt or water can enter the housing 500.

In a particularly preferred embodiment, the membrane 550, which protects the vibrating element 14, is well permeable to water vapor and at the same time a good barrier for liquid water. Suitable membranes for such requirements are Goretex membranes, Sympatex or other membranes that are also used in the production of sports and outdoor functional clothing. The suitability of the membrane 550 can be measured by the water vapor permeability and the so-called water column that describes the resistance against the penetration of liquid water. Suitable measurement methods for water vapor permeability are described in the ASTM E96 Standard, Procedure B (water method). Suitable methods for measuring the water column are described in the International Standard ISO 811-1981 (E). Membranes 550 with a water vapor permeability of more than 400 grams per square meter and day at 23° C. and a water column of more than 5 meters are particularly suitable.

In another special embodiment, the above membrane 550 consists of a polymer film which is characterized by good water vapor permeability. Suitable films can be produced from polyurethane or copolymers with hydrophobic and hydrophilic components. Such diaphragms 550 are suitable for using sensors in areas containing fuel or other solvents or oil, especially areas where oily droplets may occur, especially near machines and engines or in electronic systems.

The arrangement of the heating element or the infrared or light emitting elements 560 in sensor 12 is of special importance for specific applications. In particular, it is of interest to place the heating or irradiation element 560 close to the vibrating element 14 without disturbing the latter in its function as vibrating element 14. Suitable arrangements are therefore opposite or diagonally in direct visual contact with the vibrating element 14.

In special arrangements it is of interest to mount the heating or irradiation element 560 in such a way that the opening of the housing or the membrane 550 mounted on it is also heated or irradiated.

When using light-emitting elements 560, it may be advantageous to position the element 560 so that some of the light can escape to the outside, thus becoming part of a signal to a user of the sensor 12. The light-emitting element 560 in this embodiment therefore performs two tasks: irradiating the vibrating element 14 and sending a signal to the user of the sensor 12. Such signals are of interest for the maintenance, calibration and monitoring of the condition of such sensors 12 as they can easily take over the function of other data reading devices and peripheral equipment.

Figure 11:
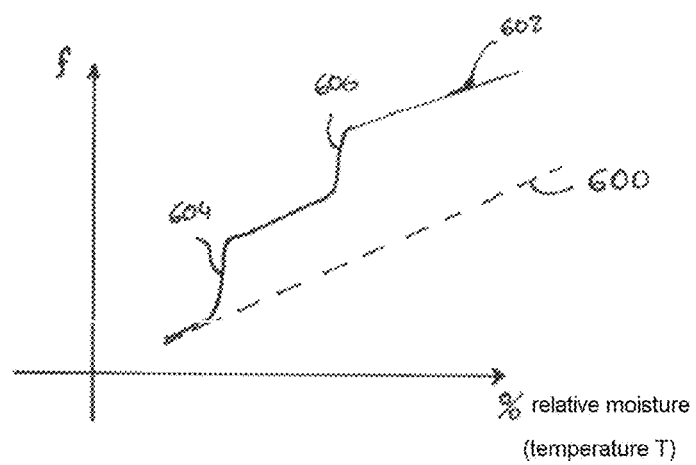
FIG. 11 a linear characteristic curve of a moisture sensor according to prior art compared to a characteristic curve with at least one non-linearity of embodiment of the moisture sensor.

FIG. 11 shows a comparison of an ideal characteristic curve 600 of a moisture sensor, as it has been strived for in the entire state of the art, with a characteristic curve 602 of a version of the moisture sensor 12 with a sensor element 10 according to one of the FIGS. 1 to 6b. The detected frequency f is shown schematically on the y-axis and the relative humidity % F on the x-axis. For a gas with a certain absolute moisture, the temperature T can also be indicated on the x-axis. The characteristic curve 602 according to the embodiments of the moisture sensors has a first non-linearity 602 and a second non-linearity 604. The non-linearities 602, 604 can be used to generate reference values.

It is known, for example, that the first material 16 has an abrupt increase in mass at a certain relative moisture value, for example due to pore condensation, while the second material 18 has a comparable increase in mass at another certain relative moisture value. If, for example, the two non-linearities are found by continuously increasing or decreasing the temperature, it is possible to obtain two unambiguous reference values and, via the relationship of the non-linearities to each other or their distance from each other, a further value for monitoring the function of the sensor.

LIST OF REFERENCE SIGNS

- 10 sensor element
- 12 moisture sensor
- 14 vibrating element
- 16 first material
- 18 second material
- 20 temperature control element
- 100 quartz crystal vibrating element
- 101 first carrier
- 102 second carrier
- 110 metal electrode
- 151 first defined-porous material (separate arrangement)
- 152 second defined-porous material (separate arrangement)
- 161 first defined-porous material (below)
- 162 second defined-porous material (above)
- 200 quartz crystal tuning fork
- 202 holder
- 204 vibrating region
- 210 first arm
- 211 soldering joint
- 220 second arm
- 221 soldering joint
- 301 first defined-porous material
- 302 second defined-porous material
- 303 first defined-porous material
- 304 second defined-porous material
- 305 first defined-porous material
- 306 second defined-porous material
- 307 first defined-porous material
- 308 second defined-porous material
- 500 housing
- 510 opening
- 550 membrane
- 560 light or infrared emitting element
- 600 linear characteristic curve 602 characteristic curve of embodiment of moisture sensor
604 first non-linearity
606 second non-linearity

The invention claimed is:

1. A moisture sensor element for a moisture sensor for measuring a moisture content in a gas, comprising:
   at least one vibrating element; and
   at least one material on the vibrating element, wherein a mass of the at least one material changes in response to a moisture value,
   wherein the at least one material is a porous material, and deviation of pore sizes of pores from an average pore size of the porous material is chosen such that the mass changes in response to the moisture value.

2. The moisture sensor element according to claim 1, characterized in that a first material with a first mass that changes in response to a first moisture value and a second material with a second mass that changes in response to a second moisture value are provided.

3. The moisture sensor element according to claim 2, characterized in that the first material and the second material are disposed
   3.1 on a same side or on opposite sides of the at least one vibrating element;
   3.2 on a same region or on different regions of the at least one vibrating element;
   3.3 side by side, one above the other or in an annular or surrounding arrangement; and/or
   3.4 on different arms or on a same arm of a vibrating element designed as a tuning fork.

4. The moisture sensor element according to claim 1, characterized in that the at least one material is a defined-porous material.

5. The moisture sensor element according to claim 2, characterized in that the first and the second material differ
   5.1 by their average pore diameter; and/or
   5.2 by their wettability; and/or
   5.3 by being provided in quantities which contain a substantially different pore volume; and/or
   5.4 by their capability to absorb light or infrared or heat radiation.

6. The moisture sensor element according to claim 1, characterized by at least one of the following features:
   7.1 that the at least one material is chosen from the group consisting of microporous, mesoporous and macroporous materials;
   7.2 that at least a part of the at least one material is treated with a surface-derivatizing reagent to change wettability;
   7.3 that at least a part of the at least one material is treated with an organosilane or organosiloxane as a surface-derivatizing reagent to change the wettability;
   7.4 that at least a part of the at least one material is provided or treated with an additive to change a radiation absorption capacity towards light or infrared or heat radiation; or
   7.5 that the at least one vibrating element is designed as a quartz crystal microbalance and/or a quartz crystal tuning fork.

7. A method for producing the moisture sensor element according to one of the preceding claims, comprising:
   8.1 providing a vibrating element; and
   8.2 coating the vibrating element with at least one material, a mass of which changes in response to a moisture value, wherein step 8.2 includes:
      8.2.1 applying a precursor material to the vibrating element; and
      8.2.2 creating pores in the precursor material to form the material, the mass of which changes in response to a moisture value.

8. A moisture sensor for determining a moisture content in a gas, comprising:
   a housing with at least one opening;
   the moisture sensor element according to claim 1 disposed inside the housing; and
   an electronic component for driving the vibrating element and providing a measurement signal.

9. The moisture sensor according to claim 8, characterized in that the housing
   10.1 comprises a temperature control element for influencing temperature of the at least one material; and/or
   10.2 comprises a heating element for influencing the temperature of the at least one material; and/or
   10.3 a light, infrared or heat radiation source for irradiating the at least one material with light, infrared or heat rays; and/or
   10.4 an LED component for irradiating the at least one material with light, infrared or heat rays; and/or
   10.5 is metallic; and/or
   10.6 has a planar surface vis-a-vis the at least one vibrating element; and/or
   10.7 includes a thermal mass which is more than 1000 times higher than a thermal mass of the at least one material applied to the at least one vibrating element; and/or
   10.8 is closed at its opening with a water vapor-permeable but water-repellent membrane.

10. A dew point sensor for determining a dew point in a gas, comprising the moisture sensor according to claim 8, wherein the electronic component is designed to provide a measurement signal that allows the dew point to be determined.

11. A moisture measuring method for measuring moisture in a gas, comprising:
    using the moisture sensor element according to claim 1, wherein a measurement signal response thereof has at least one non-linearity; and
    determining a reference value based on the at least one non-linearity.

12. The moisture measuring method according to claim 11, characterized by:
    using the moisture sensor element, wherein the measurement signal response thereof has a first non-linearity and a second non-linearity according to moisture; and
    determining the reference value based on a comparison of the first non-linearity and the second non-linearity.

13. The moisture measuring method according to claim 11, characterized by at least one of the following steps:
    15.1 using two or more changes of vibration behavior of the at least one vibrating element for reference value determination and/or calibration;
    15.2 heating the at least one vibrating element and detecting one or more changes in frequency of the vibrating element during the heating; or
    15.3 repeatedly heating the at least one vibrating element and detecting changes in frequency of the at least one vibrating element during a cooling or cold phase between two heating cycles, to detect frequency decrease as a number of heating/cooling phases decreases, wherein the moisture value or a dew point is determined from the frequency decrease.

\* \* \* \* \*

UNITED STATES PATENT AND TRADEMARK OFFICE
CERTIFICATE OF CORRECTION

| | | |
|---|---|---|
| PATENT NO. | : 11,460,390 B2 | Page 1 of 1 |
| APPLICATION NO. | : 16/765347 | |
| DATED | : October 4, 2022 | |
| INVENTOR(S) | : Wendelin J. Stark | |

It is certified that error appears in the above-identified patent and that said Letters Patent is hereby corrected as shown below:

On the Title Page

At the (72) "Inventor:", "Wendelin J. Stark, Langenthal (DE)" should be corrected to -- Wendelin J. Stark, Langenthal (CH) --

Signed and Sealed this
Fifteenth Day of November, 2022

*Katherine Kelly Vidal*

Katherine Kelly Vidal
*Director of the United States Patent and Trademark Office*